Aug. 26, 1952    G. E. LINDHE    2,608,037
ARRANGEMENT FOR THE AUTOMATIC FEED OF RODLIKE
OR TUBULAR WORKPIECES IN MACHINE TOOLS, MORE
ESPECIALLY CENTRELESS GRINDERS
Filed May 1, 1951    8 Sheets-Sheet 1

Inventor
Gunnar E. Lindhe
By Watson, Cole, Grindle & Watson
Attorneys

Aug. 26, 1952     G. E. LINDHE     2,608,037
ARRANGEMENT FOR THE AUTOMATIC FEED OF RODLIKE
OR TUBULAR WORKPIECES IN MACHINE TOOLS, MORE
ESPECIALLY CENTRELESS GRINDERS

Filed May 1, 1951     8 Sheets-Sheet 3

Inventor
Gunnar E. Lindhe
By Watson, Cole, Grindle & Watson
Attorneys

Aug. 26, 1952 G. E. LINDHE 2,608,037
ARRANGEMENT FOR THE AUTOMATIC FEED OF RODLIKE
OR TUBULAR WORKPIECES IN MACHINE TOOLS, MORE
ESPECIALLY CENTRELESS GRINDERS
Filed May 1, 1951 8 Sheets-Sheet 4

Inventor
Gunnar E. Lindhe
By Watson, Cole, Grindle & Watson
Attorneys

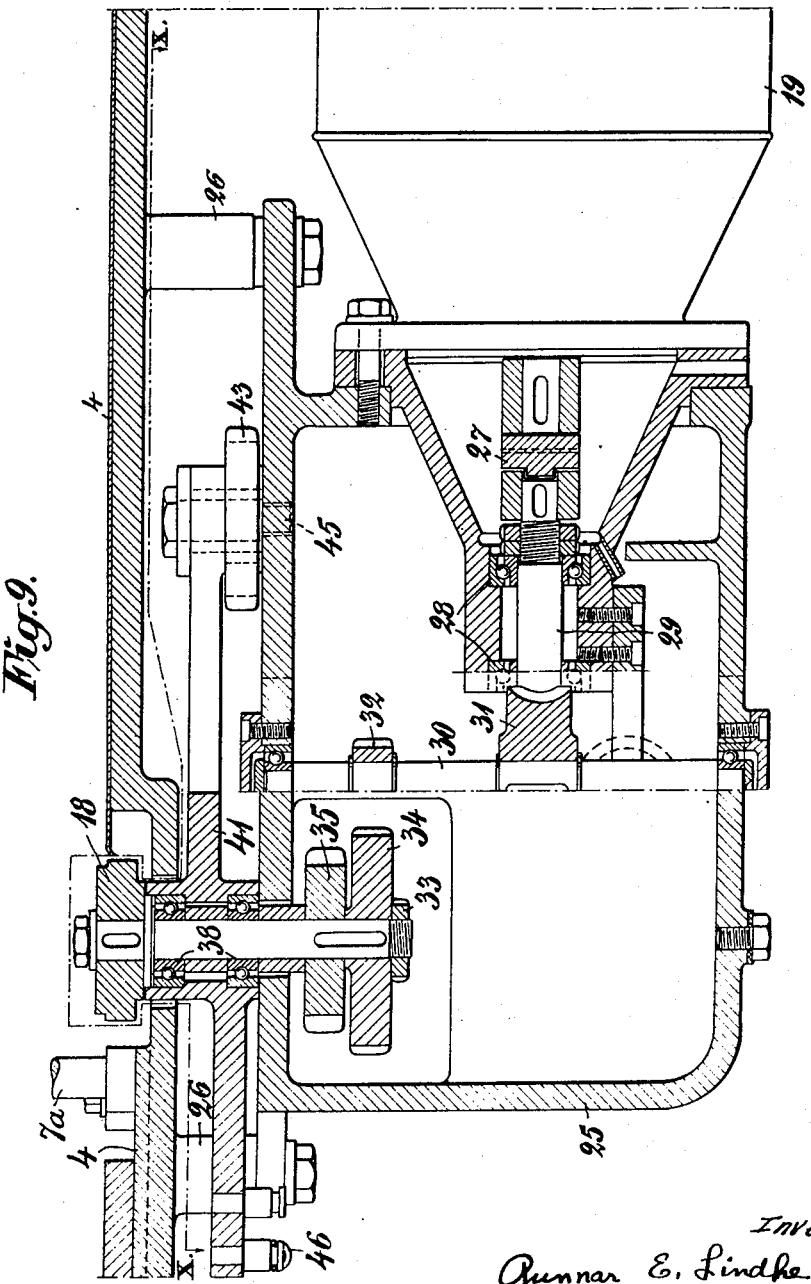

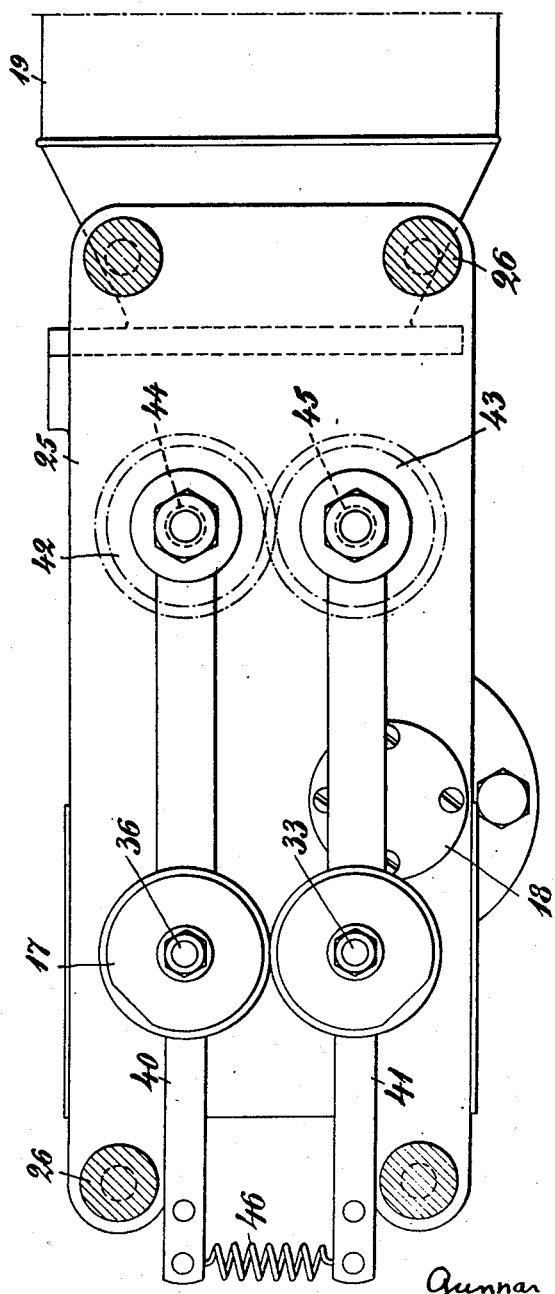

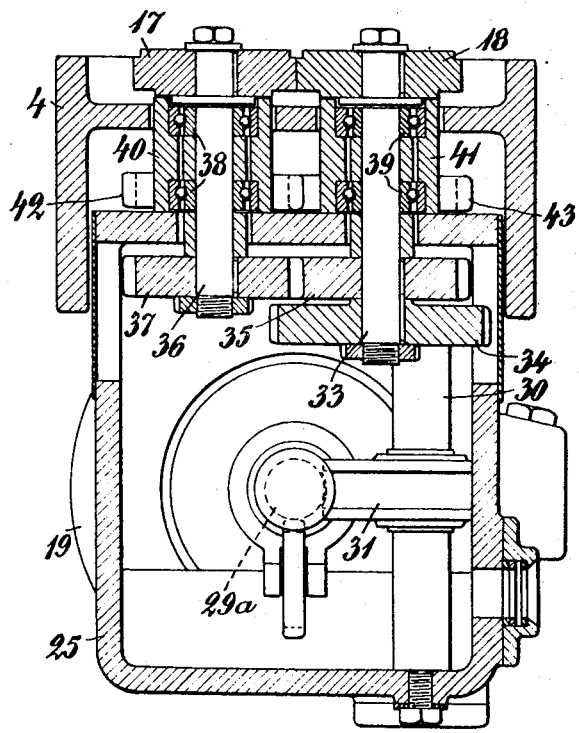

Aug. 26, 1952 G. E. LINDHE 2,608,037
ARRANGEMENT FOR THE AUTOMATIC FEED OF RODLIKE
OR TUBULAR WORKPIECES IN MACHINE TOOLS, MORE
ESPECIALLY CENTRELESS GRINDERS
Filed May 1, 1951 8 Sheets-Sheet 8
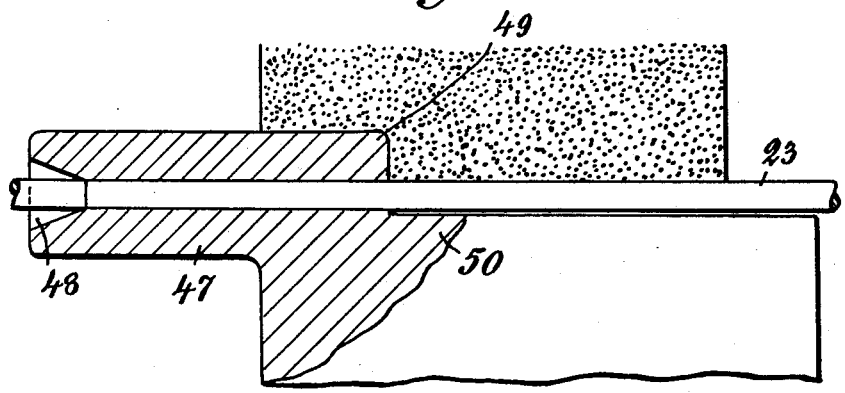
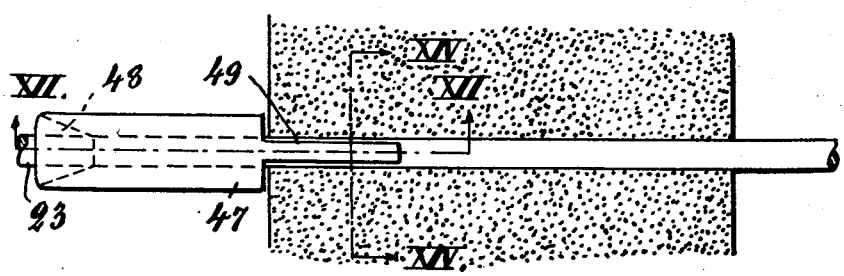
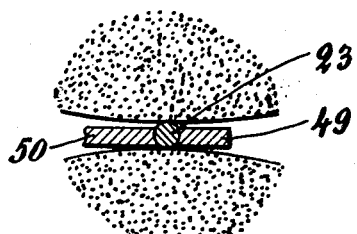

Patented Aug. 26, 1952

2,608,037

UNITED STATES PATENT OFFICE 2,608,037

ARRANGEMENT FOR THE AUTOMATIC FEED OF RODLIKE OR TUBULAR WORKPIECES IN MACHINE TOOLS, MORE ESPECIALLY CENTRELESS GRINDERS

Gunnar Emanuel Lindhe, Halmstad, Sweden

Application May 1, 1951, Serial No. 223,936
In Sweden July 11, 1950

2 Claims. (Cl. 51—215)

This invention relates to an arrangement for automatically feeding rod-like or tubular workpieces in machine tools, more especially centreless grinders, that is to say, grinding machines in which the workpiece is not clamped between centres, but is automatically and continuously displaced on a guide.

The introduction of such workpieces in centreless grinders has hitherto generally been effected manually, since the problem of automatically feeding very long rods and tubes has not been solved in a satisfactory manner. However, the invention renders it possible to feed relatively short and also very long rod-like or tubular workpieces with comparatively simple mechanical auxiliary means, and is essentially characterized in that the feed arrangement consists of at least one pair of conveniently circular rollers or discs revolving in opposite directions, one roller or disc of the pair being located on one side of the workpiece and the other on the other side, the two discs being resiliently urged towards one another until they are spaced apart at a distance which is somewhat smaller than the diameter of the workpiece, and being so arranged or so constructed that the gap between them can be suddenly increased in such a manner that the workpieces, from a magazine or the like conveniently arranged above and in the centre between the discs, drop successively into the disc gap and can be clamped and displaced by the disc due to the continued rotation thereof.

A further feature which is characteristic of the invention consists in that the magazine is constituted of two or more pairs of supports between which the workpieces are stacked in layers one above the other, each pair of supports being arranged on a bottom plate and these bottom plates being so connected with one another by means of a linkage system that the supports can be adjusted by rotation of the bottom plates to a different spacing from the axis along which the feeding of the workpieces takes place, depending upon the diameter of the series of workpieces to be worked.

The arrangement according to the invention provides, inter alia, the advantage that the machine tool, on account of the continuous feeding of the workpieces, operates completely automatically so long as workpieces are disposed in the magazine, so that two or more machines can be simultaneously operated by one man. With centreless circular grinding machines, for example, the grinder can carry out without interruption the measuring and controlling of the ground surface during the grinding operation.

These and other features of the invention will be more fully explained hereafter on the basis of the description of one embodiment of the feeding arrangement illustrated in the drawings, which is essentially intended for the feeding of round rods or tubes with a diameter of 1.5 to 6 mm. in a centreless circular grinding machine.

Figs. 6a, 6b, 7a, 7b, 8a and 8b show diagrammatically the disc in different operative positions, while Figs. 9–11 show details of the feeding arrangement.

Figure 1:
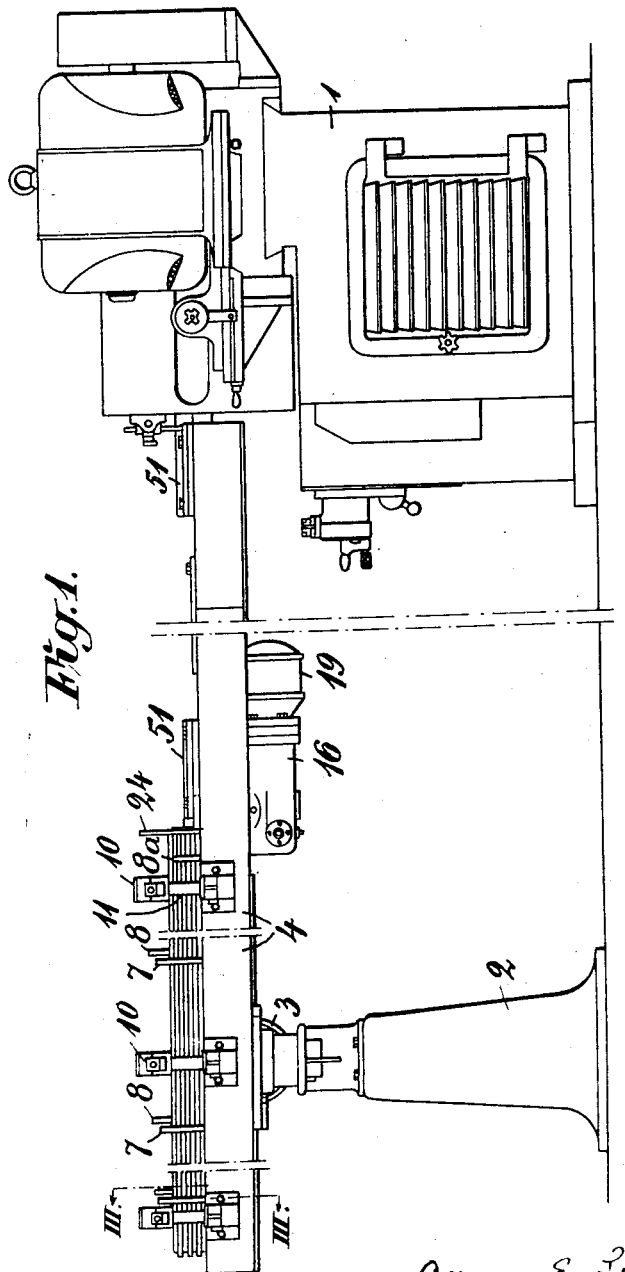
Fig. 1 is a side elevation of a centreless grinding machine with a front table and a feeding arrangement according to the invention.
Figure 2:
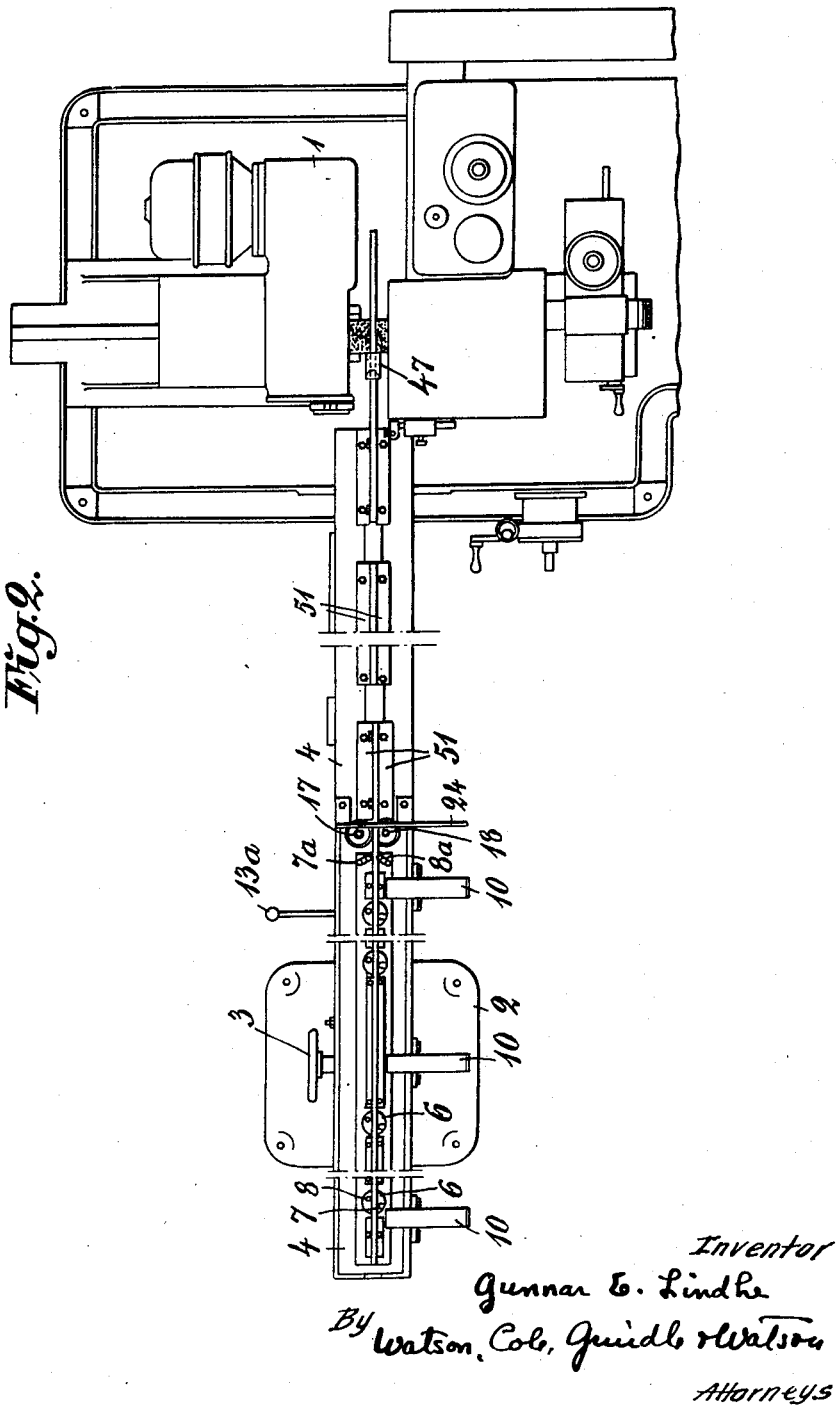
Fig. 2 is a corresponding plan view.
Figure 3:
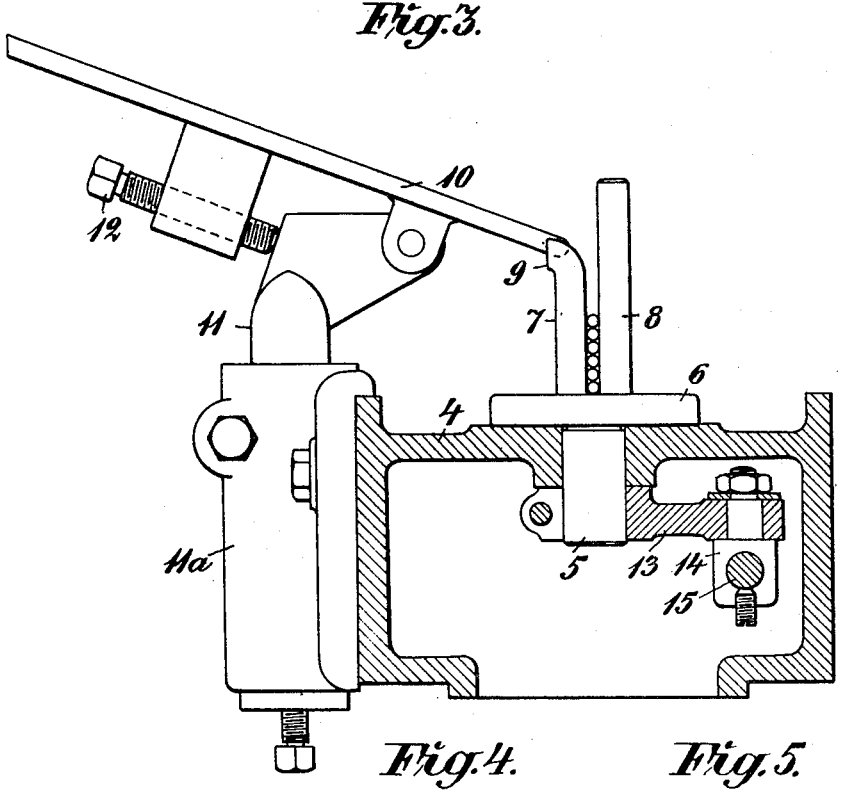
Fig. 3 is a section on the line III—III of Fig. 1, which clearly shows the magazine for the rodlike material to be ground.
Figure 4:
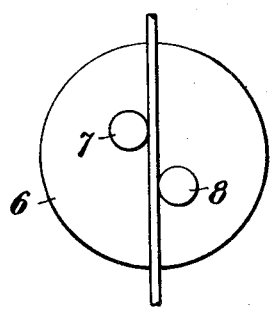
Figs. 4 and 5 show diagrammatically the adjustment of the magazine for different diameters of the rod material.
Figure 5:
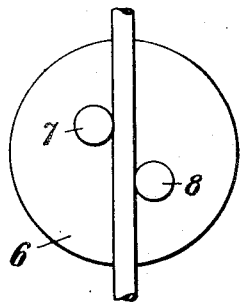

Finally, Figs. 12, 13 and 14 show a feeding in mouthpiece in side elevation and partly in section, or in plan view.

The circular grinding machine 1 is provided in a manner known per se with a front table 4 arranged to be raised and lowered on two supports or pedestals 2 by means of wheels 3, the length of said table corresponding to approximately twice the length of the rods to be fed and being moreover laterally adjustable and also, if necessary, removed from the grinding machine.

Arranged on portion of the table which is furthest from the grinding machine is a magazine intended for the rod material to be ground. This magazine consists of a number of bottom plates 6 distributed along this portion of the table and rotatably mounted on pins 5 projecting through the table. Projecting upwardly from each of these plates are two supports 7, 8, one of which is shorter than the other and is formed at its upper end 9 with an outwardly bent portion on which is attached an inclined bearing surface 10. These bearing surfaces 10 are provided to carry the rod-like workpieces, which are then successively supplied to the magazine in a pile formed between the supports 7 and 8. The bearing surfaces 10 are pivotally secured to pins 11 arranged in sleeves 11a on the front table 4; the inclination of such surfaces can be adjusted by means of a screw 12. Each pin 5 is provided at its lower end with a lever arm 13 extending substantially transversely of the longitudinal direction of the table, the free end of such arm carrying a rotatable fixing element 14 for a rod 15 which interconnects all the lever arms 13. By means of this arrangement, the magazine can be adjusted as required for rod material of different dimensions by rotating the bottom plates 6 into different angular positions by means of a common handle 13a or the like secured to one of the lever arms 13, as apparent from Figs. 1, 3, 4 and 5. In order to ensure an accurate adjustment of the rod ends located at the feeding arrangement, the front table can be provided in the direct vicinity of the feeding arrangement with a pair of guide elements 7a, 8a, which are each independently adjustable and which are displaceable in the transverse direction of the table and can be locked by means of screw bolts or the like.

Figure 6A:
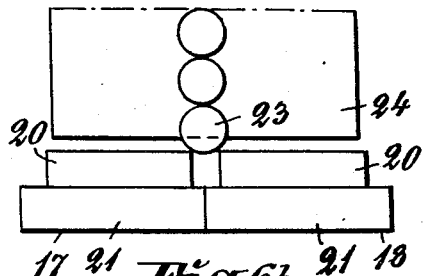
Figure 7A:
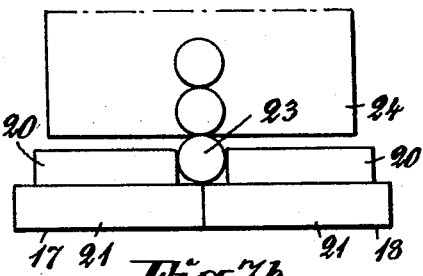
Figure 6B:
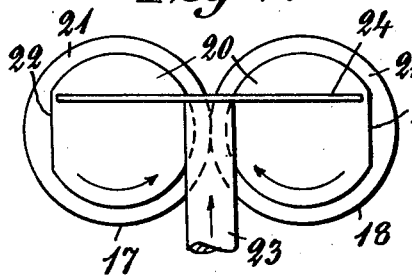
Figure 7B:
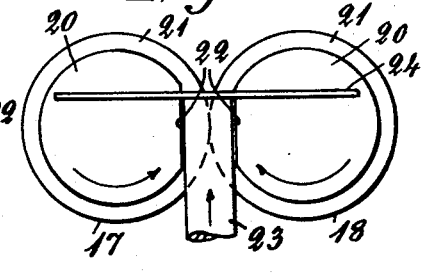
Figure 8A:
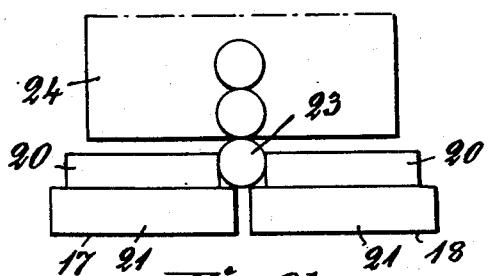
Figure 8B:
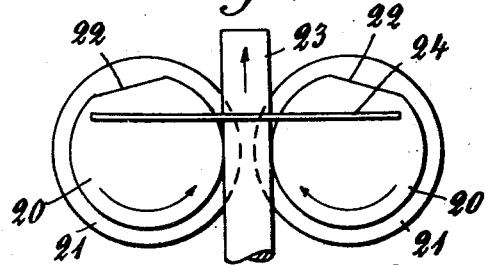

The feeding arrangement consists of a readily detachable assembly 16 which is built into the front table 4 and which includes two circular discs 17, 18 driven in opposite directions but at the same speed, driving arrangements for these discs and a driving motor 19, which is conveniently a variable speed direct current motor. The functioning of the discs 17, 18 is shown most clearly in Figs. 6a—8b. They each consist of two parts 20, 21 of different diameters, the upper part 20 being so much smaller than the lower part 21 that the space which is provided between the upper parts 20 of the two discs 17, 18 when the lower parts 21 are urged towards one another by a spring arrangement is somewhat smaller than the diameter of the rod-like workpiece. Each of the two upper parts 20 is provided at one point of its periphery with a "flat" or recess. These recesses are so arranged that, during the rotation of the discs, they take up corresponding angular positions with respect to the longitudinal axis of the workpiece, and are of such a depth that the spacing between the planes of the recesses, when these are facing one another (Figs. 7a and 7b) is somewhat larger than the diameter of the rod-like material located in the magazine. Upon placing the rods in the magazine, the bottom rod 23 bears with its forward end on the upper edges of the upper disc portions 20 (see Figs. 6a), and is prevented from being pushed axially by the friction against the discs by a wall 24 arranged close above the discs.

When the discs 17, 18, during their rotation, take up such a position that the recesses 22 are opposite one another, the spacing between the edges of the upper disc parts 20 suddenly becomes so much greater that the bottom rod 23 drops between the discs (Figs. 7a and 7b) and, with continued rotation of the discs (Figs. 8a and 8b), the rod is firmly pressed between the adjoining resilient feed discs, so that it is advanced beneath the wall 24. As soon as this rod has completely left the magazine, the next rod drops into the position shown in Figs. 6a and 6b, and the operation is repeated.

The arrangement provided for the drive of the feed discs, and also the spring system, can be seen in Figs. 9–11, which show the assembly 16 in longitudinal section, plan view and cross section, respectively. It consists essentially of a housing 25, which is arranged by means of fixing elements 26 on the under side of the front table 4 and carries the driving motor 19 and the gearing necessary for the drive of the feed discs. The motor 19 is connected with the discs 17, 18 through a transmission, which is constituted by a clutch 27, a horizontal worm shaft 29 mounted in ball bearings 28, a worm 29a, a worm wheel 31 secured on a vertical shaft 30 and also a series of gears provided with straight teeth. These gears consist of a pinion 32 secured at the upper end of the shaft 30 and a gear 34 to which the turning moment of the shaft 30 is transmitted and which is secured on the shaft 33 of the feed disc 18. Arranged on the same shaft 33 is a further gear 35 which meshes with a gear 37 fixed on the shaft 36 of the disc 17 and having the same number of teeth as the gear 35, whereby the two discs 17, 18 are driven in opposite directions, but at the same speed.

Each of the shafts 36, 33 is rotatably mounted by means of ball bearings 38 or 39 on a lever arm 40 or 41. Each of the lever arms 40, 41 is provided at one end with a fixedly secured gear or rim gear wheel 42 or 43 and is so oscillatably mounted on a pin 44 or 45 in the upper side of the housing 25 that the rim gear wheels 42, 43 are in mesh with one another. Connected between the opposed free ends of the lever arms 40, 41 is a helical spring 46 which is such that the lever arms tend to move towards one another. By means of this arrangement, the discs are brought to bear on one another, and when they are urged apart by the action of the workpieces, the angle of deflection of each lever arm 40 or 41 on each side of the axis of the workpiece is the same, due to the intermeshing of the rim gear wheels 42, 43. The teeth of the gears 34, 35 and 37 should have such a tooth height that a positive tooth engagement is assured even when the spacing between the centres of the gears is somewhat increased due to a workpiece being forced between the discs 17, 18.

When the discs 17, 18 have gripped a rod-like workpiece, the latter is advanced at a speed which is somewhat less than the speed with which the grinding machine advances the workpiece being worked upon between guide rails 51 or the like, and the spacing between the discs 17, 18 and the grinding wheel of the grinding machine is to be somewhat larger than the length of the workpiece, so that the advance of the workpiece in the grinding machine is not impeded by the somewhat slower introduction or feeding under the action of the discs. When the workpiece has passed the discs, it is advanced over the remainder of its path up to the grinding position by the rod located behind it which is fed forward by the discs 17, 18.

In order to ensure the correct introduction of the workpiece into the grinding position, a special mouthpiece 47 is provided (see Figs. 12 to 14), which projects partially between the grinding wheel and the counter-pressure roller of the centreless grinding machine. The part of the mouthpiece which is directed towards the front table is provided with a funnel-like mouth 48, and the part which projects between the grinding wheel and the counter-pressure roller is provided with an upper and a lower disc-shaped control bar 49 or 50 (Fig. 14), the thickness of which is somewhat smaller than the diameter of the workpiece, so that the latter is free at the sides and can be gripped by the grinding wheel and the counter-pressure roller and advanced during the working operation in a manner known per se.

The invention is naturally not restricted to the embodiment described herein by way of example. This can be modified in many ways within the scope of the invention. Thus it is possible, inter alia, to provide the discs 17, 18 with eccentric or otherwise shaped grooves or threads instead of the recesses 22, so that they grip the rod-shaped workpieces and release them suddenly. They can also be moved mechanically from and towards one another, so that the same effect is obtained. Should it prove to be expedient, it is possible to distribute several recesses around the disc periphery, and in order to produce a more uniform feed, two or more pairs of discs or rollers may be provided, the recesses in the different pairs of discs or rollers being displaced relatively to one another. As already emphasized in the introduction to the specification, the feeding arrangement can also be utilised in machine tools other than centreless grinding machines.

Finally, the rollers may be made conical in such manner that the gap between them is V-shaped. By this means, the advantage is obtained that the rollers do not have to be movable towards one another, which naturally represents a simplification of the whole arrangement.

Having now particularly described the nature of my invention and the manner of its operation, what I claim is:

1. Arrangement for automatic feeding of rod-like workpieces to machine tools, more especially centerless grinding machines, comprising a table positioned in front of the machine to be fed, at least one pair of substantially circular disc-like feeding rollers, vertical shafts rotatably mounting said rollers on said table, a motor and gearing connected for continuously rotating said rollers, each of said rollers consisting of two parts of different diameters arranged one above the other, the upper part of each being sufficiently smaller than the lower part so that the gap existing between the peripheral surfaces of the two upper roller parts, when the lower roller parts are bearing on one another, is somewhat smaller than the diameter of the workpiece, each of said upper roller parts being provided with a flattened part on its peripheral surface, said flattened parts being so dimensioned that when facing one another, the gap between them is somewhat greater than the diameter of the workpiece, means for resiliently urging said rollers against one another, and a magazine arranged above and centrally between the rollers for guiding workpieces into the gap presented when said flattened parts on said upper roller parts face each other, whereby the workpieces are serially fed towards the machine by further rotation of the rollers.

2. Arrangement for automatic feeding of rod-like workpieces in machine tools, more especially centerless grinding machines comprising a table positioned in front of the machine to be fed, at least one pair of substantially circular disc-like feeding rollers, vertical shafts rotatably mounting said rollers on said table, a motor and gearing connected for continuously rotating said rollers, each of said rollers consisting of two parts of different diameters arranged one above the other, the upper part of each being sufficiently smaller than the lower part so that the gap existing between the peripheral surfaces of the two upper roller parts, when the lower roller parts are bearing on one another, is somewhat smaller than the diameter of the workpiece, each of said upper roller parts being provided with a flattened part on its peripheral surface, said flattened parts being so dimensioned that when facing one another the gap between them is somewhat greater than the diameter of the workpiece, means for resiliently urging said rollers against one another, and a magazine arranged above and centrally between the rollers for guiding workpieces into the gap presented when said flattened parts on said upper roller parts face each other, whereby the workpieces are serially fed towards the grinding machine by further rotation of the rollers, said magazine comprising at least two pairs of supports between which the workpieces are stacked in layers one above the other, each pair of supports being fixed on a rotatable bottom plate, and a linkage system connecting these bottom plates with one another in such a way that the supports can be adjusted by rotation of the bottom plates to a different spacing from the axis along which the feeding of the workpiece takes place, according to the diameter of the workpiece to be worked upon.

GUNNAR EMANUEL LINDHE.

REFERENCES CITED

The following references are of record in the file of this patent:

UNITED STATES PATENTS

| Number | Name | Date |
|---|---|---|
| 132,519 | Braun | Oct. 29, 1872 |
| 1,248,051 | Agnew | Nov. 27, 1917 |
| 1,804,422 | Koch | May 12, 1931 |

FOREIGN PATENTS

| Number | Country | Date |
|---|---|---|
| 392,406 | Germany | Mar. 20, 1924 |